United States Patent
Grosser et al.

(10) Patent No.: US 12,435,228 B2
(45) Date of Patent: Oct. 7, 2025

(54) PRINTING INK CONTAINING UNDRIED, COATED TITANIUM DIOXIDE

(71) Applicant: KRONOS WORLDWIDE, INC., Dallas, TX (US)

(72) Inventors: Ingo Grosser, Hamburg (DE); Nicole Kolmer-Anderl, Langenfeld (DE); Annika Herbst, Düsseldorf (DE); Simon Münzer, Langenfeld (DE)

(73) Assignee: Kronos International, Inc., Leverkusen (DE)

( * ) Notice: Subject to any disclaimer, the term of this patent is extended or adjusted under 35 U.S.C. 154(b) by 106 days.

(21) Appl. No.: 17/124,987

(22) Filed: Dec. 17, 2020

(65) Prior Publication Data

US 2021/0189161 A1    Jun. 24, 2021

Related U.S. Application Data

(60) Provisional application No. 62/985,393, filed on Mar. 5, 2020.

(30) Foreign Application Priority Data

Dec. 18, 2019 (EP) .................................... 19000569

(51) Int. Cl.
- C09D 11/322 (2014.01)
- C09C 1/36 (2006.01)
- C09D 11/033 (2014.01)
- C09D 11/037 (2014.01)

(52) U.S. Cl.
CPC .......... *C09D 11/322* (2013.01); *C09C 1/3661* (2013.01); *C09D 11/033* (2013.01); *C09D 11/037* (2013.01); *C01P 2004/84* (2013.01); *C01P 2006/10* (2013.01)

(58) Field of Classification Search
CPC ... C09D 11/322; C09D 11/033; C09D 11/037; C09C 1/3661; C01P 2004/84; C01P 2006/10
See application file for complete search history.

(56) References Cited

U.S. PATENT DOCUMENTS

| | | | |
|---|---|---|---|
| 3,676,729 A * | 7/1972 | Menelly | H01J 61/35 313/635 |
| 7,803,858 B2 * | 9/2010 | Pressley | C09D 5/028 524/706 |
| 2006/0189740 A1 * | 8/2006 | Kamimura | C01F 7/02 423/625 |
| 2007/0060670 A1 | 3/2007 | Du Pont | |
| 2008/0141905 A1 | 6/2008 | Juergens et al. | |
| 2008/0268156 A1 | 10/2008 | Yoshiaki et al. | |
| 2009/0009852 A1 * | 1/2009 | Honeyman | G02F 1/167 428/407 |
| 2010/0125117 A1 | 5/2010 | Drews-Nicolai et al. | |
| 2012/0107529 A1 * | 5/2012 | Simpson | B41M 5/504 428/32.15 |
| 2015/0166794 A1 | 6/2015 | Hommes et al. | |
| 2019/0345354 A1 | 11/2019 | Huang et al. | |
| 2020/0248000 A1 | 8/2020 | Venator | |

FOREIGN PATENT DOCUMENTS

| | | | |
|---|---|---|---|
| CN | 102216398 A | | 10/2011 |
| EP | 1924658 A1 | | 5/2008 |
| TW | 200837154 A | | 9/2008 |
| TW | 201527445 A | | 7/2015 |
| WO | WO 2013/086596 | * | 6/2013 |
| WO | 2014135843 A1 | | 9/2014 |
| WO | WO2019076790 A1 | | 4/2019 |

OTHER PUBLICATIONS

Machine English translation of WO 2013/086596, Aparecido Sigoli et al., Jun. 2013.*
Odian, George, Principles of Polymerization, Third Edition, 1991, pp. 19-24.*
Author Unknown, Chemours Ti-Pure Titanium Dioxide Product Bulletin "Titanium Dioxide for Coatings", available at https://www.studocu.com/latam/document/universidad-nacional-de-ingenieria-nicaragua/ingenieria-quimica/titanium-dioxide-for-coatings/61271546, 2019, pp. 1-30.*

* cited by examiner

*Primary Examiner* — Patrick D Niland
(74) *Attorney, Agent, or Firm* — Troutman Pepper Locke LLP; Mark R. Backofen

(57) ABSTRACT

An aqueous printing ink comprised of undried, coated titanium dioxide pigment particles obtainable by a method comprising the steps of (i) providing an aqueous suspension of titanium dioxide base pigments, and (ii) forming at least one coat on said titanium dioxide base pigments as well as to an aqueous slurry containing the pigment particles. In addition, the present invention pertains to a method for obtaining said aqueous printing ink, a method for printing the aqueous printing ink onto the surface of a substrate, and a printing ink container as well as an inkjet printer comprising said ink. Finally, the present invention relates to the use of the aqueous printing ink to print a printing image onto the surface of a substrate.

23 Claims, No Drawings

PRINTING INK CONTAINING UNDRIED, COATED TITANIUM DIOXIDE

RELATED APPLICATIONS

This application claims the benefit of European Patent Application No. 19000569.4 filed on Dec. 18, 2019 and U.S. Provisional Patent Application No. 62/985,393, filed on Mar. 5, 2020.

BACKGROUND OF THE INVENTION

Field of the Invention

The invention relates to an aqueous printing ink comprised of undried, coated titanium dioxide pigment particles obtainable by a method comprising the steps of (i) providing an aqueous suspension of titanium dioxide base pigments, and (ii) forming at least one coat on said titanium dioxide base pigments as well as to an aqueous slurry containing the pigment particles. In addition, the present invention pertains to: a method for obtaining said aqueous printing ink; a method for printing the aqueous printing ink onto the surface of a substrate; a printing ink container; an inkjet printer comprising said ink; and a method of using the aqueous printing ink to print an image onto the surface of a substrate.

Technological Background of the Invention

Printing inks are used to provide a white print image with a good visibility when printed on transparent and colored surfaces. There are numerous applications for said inks such as computer chips and printed circuit boards, tapes, glass, plastics, textiles and in particular packagings based on plastics, polymeric films, papers, as well as industrial coatings which are commonly printed on automotives, planes and trains.

Printing inks, in particular for inkjet technologies, for high-end application use titanium dioxide as white pigment due to its high brightness and high refractive index. In general, it is essential to printing inks for inkjet technologies to possess a low viscosity, as otherwise, the ink cannot be processed through the nozzles of the printhead and the nozzles are clogged. Moreover, water can be employed as solvent, which is less toxic, sustainable, and cost sensitive in comparison to inks based on organic solvents.

However, the use of titanium dioxide particles in printing inks entails various challenges. One of the biggest challenges is the sedimentation tendency of titanium dioxide particles in inks, in particular in slurries with a low viscosity of less than 20 mPas. This leads to significant problems. For example, sedimentation results in less dispersed titanium dioxide in the ink, which negatively effects important core properties of the ink such as hiding power and gloss. Moreover, the sedimentation can lead to clogged nozzles of the print head. As a result, the content of titanium dioxide particles in inks is limited.

In WO 2014/135843 A1, examples of a white ink are described with a titanium dioxide content of 8 to 12 wt. %. However, studies from other areas of paints and coatings clearly show that in order to achieve a hiding power of at least 98, a titanium dioxide content of at least 18 wt. % referred to the composition is required. At present, this is compensated by a higher layer thickness usually achieved by multiple printings of the ink to the substrate to be printed on. Of course, this is time-intensive and thus cost-intensive. Ideally, a single coat achieved by a single print possesses the desired hiding power.

The prior art approaches the settling tendency by re-dispersing the particles prior to its use. This can be accomplished by equipping print head systems with circulation pumps keeping the ink in motion. Of course, this requires space and energy for the pumps. In other print head systems in which no circulation pumps can be integrated, the inks sometimes have to be manually re-shaken in a time-consuming and resource-consuming manner. In addition, a high settling tendency or poor re-dispersibility also increases the risk that print heads are clogged after prolonged life in the so-called latency by poorly dispersed and thus too large agglomerates of titanium dioxide particles.

US 2019/0345354 describes a white color paste for digital textile printing ink. The comparable high titanium dioxide content is realized by the use of dispersant and also a wetting agent. However, the use of additional compounds such as wetting agents is not desirable, as more costs are involved and the compounds may have an undesirable impact upon the ink and the printing image.

Hence, there is a need in the art for a sustainable aqueous printing ink with titanium dioxide as white pigment with a low viscosity, reduced settling tendency and a high shelf life, which are moreover easy to handle.

DESCRIPTION OF THE INVENTION

Object and Brief Description of the Present Invention

It has been surprisingly found that an aqueous printing ink comprising undried, coated titanium dioxide pigment particles obtainable by a method comprising the steps of (i) providing an aqueous suspension of titanium dioxide base pigments, and (ii) forming at least one coat on said titanium dioxide base pigments, the coat is selected from the group consisting of silica, alumina, zirconia and a mixtures thereof to obtain the undried, coated titanium dioxide pigment particles meet the needs in the art. The resulting particles possess an improved shelf life with little sedimentation tendency. Therefore, there is less need to re-disperse the ink prior to its use neither manually nor by means of a devise such as a pump. Any amount of sediment that does form can easily be re-dispersed and does not form a sticky sediment such as inks of the art. This makes the ink easy to handle and imparts the ink of the present invention a long shelf life. The mixtures can be comprised of two or three of the components (e.g., silica and alumina or silica alumina and zirconia) or two or more of the components can be applied sequentially as individual coats on the base layer.

The approach of the present invention is not based on dispersion auxiliaries, anti-settling agents or higher viscosities, but on the titanium dioxide particle and its surface.

Titanium dioxide base material is manufactured according to the sulphate process or chloride process, both well-established in the art. To adapt the physical properties according to the requirements of the application, the obtained base pigment is commonly subject to aftertreatment by applying at least one coat onto said base pigment. The base pigments are preferably in the form of primary particles as opposed to agglomerates. Primary particle, as used herein, relates to a particle which may form together with at least one other particle to form agglomerates and aggregates. This definition of primary particles also covers twins and multiple twins, which are known in the art and can be analyzed by, for example, TEM analysis. If necessary, said base pigment or the agglomerates thereof may be milled before or after using established methods in order to increase the proportion of the base pigment that is present as primary particles as opposed to agglomerates. A known post-treatment coat is the deposition of an alumina layer which is applied as the last layer and provides for improved dispersibility when used in coating applications. After applying the layers, the pigment is washed and filtered and then commonly dried with a temperature of more than 100° C. and optionally dry-milled. In these drying steps, water is evaporated and the number of molecules with chemical groups, which can interact with water and/or other compounds such as dispersing agents, is reduced to a high extent. Dried titanium dioxide pigments particles are obtained.

Conventional coats contain among them, inter alia, silica, alumina and zirconia, which are alternatively present as mixtures and/or may be doped with common dopants. In standard applications, the reduction of water and OH groups from the base or coated pigment particles is essential. For example, when the pigment is processed in a medium at elevated temperature, the pigment may release water, which adversely affects the product properties. In the production of polymers, water vapor can thus be formed in the extrusion step leading to undesired bubble formation in the resulting polymer product. Moisture in pigments for laminate applications together with oxygen an exposed to UV radiation greys undesirably the laminate.

The present invention dispenses with any drying of the final coated titanium dioxide particles. The pigment particles of the present invention are undried, coated titanium dioxide pigment particles with a coat as described herein. As a result of being undried coated particles, the coated pigment particles possess significantly more chemical groups on the particle surface, which can interact with water and/or dispersing agents compared to dried particles, which are used as pigments in conventional inks.

Therefore, in a first aspect, the present invention is directed to an aqueous printing ink comprising undried, coated titanium dioxide pigment particles obtainable by a method comprising the steps of:
i) providing an aqueous suspension of titanium dioxide base pigments, and
ii) forming at least one coat on said titanium dioxide base pigments, the coat is selected from the group consisting of silica, alumina, zirconia and mixtures thereof to obtain the undried, coated titanium dioxide pigment particles.

In a second aspect, the present invention pertains to a method for obtaining an aqueous printing ink comprising undried, coated titanium dioxide pigment particles comprising the steps of:
i) providing an aqueous suspension of titanium dioxide base pigments,
ii) coating the titanium dioxide base pigments with at least one coat selected from the group consisting of silica, alumina, zirconia and mixtures thereof in order to obtain undried, coated titanium dioxide pigment particles,
iii) optionally separating and washing the undried, coated titanium dioxide pigment particles from the aqueous suspension, and re-dispersing the obtained undried, coated titanium dioxide pigment particles in water to obtain the aqueous printing ink.

In a further aspect, the present invention is directed to an aqueous slurry comprising (i) 40.0 to 70.0 wt. %, preferably 45.0 to 65.0 wt. %, more preferably 50.0 to 60.0 wt. % undried, coated titanium dioxide pigment particles with respect to the total weight of the aqueous slurry obtainable by a method comprising the steps of
a) providing an aqueous suspension of titanium dioxide base pigments, and
b) forming at least one coat on said titanium dioxide base pigments, the coat is selected from the group consisting of silica, alumina, zirconia and mixtures thereof to obtain the undried, coated titanium dioxide pigment particles; and
(ii) 0.2 to 20.0 wt. %, preferably 0.8 to 15 wt. %, and more preferably 1.5 to 10.0 wt. % of a dispersant with respect to the total weight of the aqueous slurry; and/or
(iii) 10.0 to 60.0 wt. %, preferably 20.0 to 50.0 wt. %, and more preferably 30.0 to 40.0 wt. % water with respect to the total weight of the aqueous slurry.

In a further aspect, the present invention pertains to a printing ink container comprising an aqueous printing ink as claimed herein.

In yet a further aspect, the present invention is directed to an inkjet printer, which comprises an aqueous printing ink as claimed herein.

In a final aspect, the present invention pertains to method of using an aqueous printing ink comprising undried, coated titanium dioxide pigment particles as claimed herein to print a printing image onto the surface of a substrate. Substrates that can be used preferably include paper, décor papers, corrugated cardboards, packaging, plastics, polymeric films, printed circuit boards, computer chips, automotives, wood, metal, glass, textiles and leather.

Further advantageous embodiments are covered by the independent claims.

Description of the Invention

These and further aspects, features and advantages of the invention become apparent to the skilled person from a study of the following detailed description and claims. Each feature from one aspect of the invention may also be used in any other aspect of the invention. Further, of course, the examples contained herein are intended to describe and illustrate the invention, but not to limit it, and in particular, the invention is not limited to such examples. Numerical ranges stated in the form "from x to y" include the values mentioned and those values that lie within the range of the respective measurement accuracy as known to the skilled person. If several preferred numerical ranges are stated in this form, of course, all the ranges formed by a combination of the different end points are also included.

All percentages stated in connection with the compositions herein described relate to percent by weight (wt. %) unless explicitly stated otherwise, respectively based on the mixture of composition in question.

"At least one" as used herein relates to one or more, i.e. 1, 2, 3, 4, 5, 6, 7, 8, 9 or more. With respect to a coat, for example, the value relates to the coat and not to the absolute number of molecules in the coat.

The aqueous printing ink of the present invention can be printed onto a great variety of substrates such as cloth and packagings based on plastics, polymeric films and papers. "Aqueous", as used herein, means that the ink is based on water used as solvent. The ink is comprised of undried, coated titanium dioxide pigment particles, which are obtainable by a method comprising the steps of (i) providing an aqueous suspension of titanium dioxide base pigments, and then (ii) forming at least one coat on said titanium dioxide base pigments, the coat is selected from the group consisting of silica, alumina, zirconia and mixtures thereof to obtain the undried, coated titanium dioxide pigment particles.

In step (i), an aqueous suspension of titanium dioxide base pigment is provided. "Titanium dioxide base pigments", as used herein, refers to titanium dioxide base pigments obtained by the sulphate or chloride process which are optionally milled, but have not been subject to any coating process or related treatment. The titanium dioxide base pigments may include a mixture of primary particles and agglomerates but preferably are at least a majority of primary pigment particles and ideally are entirely primary pigment particles. Further, said base pigment may be present in the crystal structures of rutile, anatase or brookite, usually in the crystal structures of rutile or anatase. Rutile is particularly suitable as compared to anatase because of its lower photolytic catalytic activity. Preferably, said base pigment consists of at least 98 wt. %, preferably of at least 99 wt. % rutile referred to the total weight of said particles. The concentration of the base pigment is well known in the art ranging from 150 g/L to 500 g/L, and is preferably 400 g/L. The suspension is obtained in known devices and can be stirred in order to obtain a homogeneous suspension.

To form the respective coat in step (ii), precursors known in the art can be used. To form a silica layer, any known silica precursor can be used such as sodium silicate, potassium silicate, and lithium silicate. Preferably, sodium silicate is used. By known methods and techniques, the silica coat can be applied. The addition of the precursor is preferably conducted under agitation, and at elevated temperature, if necessary. The precursor can be added to the suspension over a course of 5 to 60 minutes, and preferably over the course of 30 minutes. The formed silica coat of the invention does not only comprise silica, but all compounds obtained by the coating such as silicon hydroxide, silicon oxide hydroxide and water containing silica phases. As used herein, a silica coat is a coating that contains one or more of silica, silicon hydroxide, silicon oxide hydroxide, and water containing silica phases, optionally along with one or more conventional dopants.

To form an alumina coat, any suitable alumina precursor can be used. Preferably, sodium aluminate, aluminum sulfate, aluminium nitrate or aluminium chloride are used as precursors, and the coat can be formed by known methods and techniques such as adding a base thereby adjusting the pH above 7. The addition of the precursor is preferably conducted under agitation, and at elevated temperature, if necessary. The precursor can be added to the suspension over a course of 5 to 60 minutes, and preferably over the course of 30 minutes. The obtained alumina layer of the invention does not only comprise alumina only, but all compounds obtained by the coating such as aluminum hydroxide, aluminum oxide hydroxide and water containing alumina phases. As used herein, an alumina coat is a coating that contains one or more of alumina, aluminum hydroxide, aluminium oxide hydroxide, and water containing alumina phases, optionally along with one or more conventional dopants.

To from a zirconia coat, any suitable zirconia precursor can be used. Preferably, zirconium oxychloride, zirconium sulfate and zirconium carboxylate are used as precursors, and the coat can be formed by using methods and techniques known in the art. The addition of the precursor is preferably conducted under agitation, and at elevated temperature, if necessary. The precursor can be added to the suspension over a course of 5 to 60 minutes, and preferably over the course of 30 minutes. The obtained zirconia layer of the invention does not only comprise not only zirconia, but all compounds obtained by the coating such as zirconium hydroxide, zirconium oxide hydroxide and water containing zirconium phases. As used herein, a zirconia coat is a coating that contains one or more of zirconia, zirconium hydroxide, zirconium oxide hydroxide, and water containing zirconia phases, optionally along with one or more conventional dopants.

If a mixture of silica, alumina and zirconia coat is formed, the respective precursors can be used. Further, combinations of silica, alumina and zirconia coats can be formed, either by forming a single coating layer that contain a mixture of two coating materials, either a uniform mixture or with varying gradients of each coating material, or by applying sequential coats of separate coating materials. Various methods of forming each type of coat, mixed coats and multiple coating layers are well known to those of skill in the art.

A preferred embodiment of the invention can be prepared as follows. First, step (i) is conducted before the at least one coat is formed in step (ii) to obtain the undried, coated titanium dioxide pigment particles.

Within the scope of the invention, the titanium dioxide pigment particle has a primary size such that it scatters visible light, ideally to a high rate. The primary particle size is the mass-related median d50 (hereinafter: d50) of from 200 to 400 nm determined by disc centrifuge. Further, preferably particle sizes (both agglomerates and primary particle sizes) greater than 600 nm should be excluded to the greatest extent possible, and preferably completely excluded, as they lead to clogging of the ink jet printhead nozzles.

"Undried", as used herein, refers to a titanium dioxide pigment particles which were coated according to the present invention, but subsequent to the final coating process were not subject to any drying process with a temperature exceeding 95° C., more preferably not subject to a drying process with a temperature exceeding 80° C., in particular not subjected to an established drying processes such as spray drying or any mechanical drying with a temperature exceeding 95° C., and more preferably not subjected to any established drying process with a temperature exceeding 80° C. More preferably, the undried titanium dioxide pigment particles are not subject to any drying process with a temperature exceeding 95° C. after the initial coat is applied.

Without wishing to be bond to a scientific theory, it is believed that the undried, coated pigment particles of the present invention possess significantly more chemical groups such as hydroxide groups and oxide groups on the surface which are capable of forming hydrogen bonds with the aqueous medium and/or dispersants compared to prior art inks with pigments which were dried after a coat was applied. This results in significant less settlement tendencies and longer shelf life. More importantly, the ink can contain a higher amount of titanium dioxide pigment particles without negatively affecting other properties or the need for high amounts of wetting and/or dispersing agents. The ink has, due to its high titanium dioxide concentration, an improved hiding power. Less coats achieved by a just a few prints already possess the desired hiding power which makes it superior to standard inks which have to be printed more often onto the substrate to achieve the same print.

In a preferred embodiment, the at least one coat is alumina. The latter is preferably formed directly on the pigment base material. Moreover, the alumina coat is of from 0.1 and 10 wt. %, preferably 2 to 5 wt. % referred to the total weight of the titanium dioxide pigment particles.

In another preferred embodiment, a silica coat is formed on said base pigments, and on said silica coat an alumina coat is formed. The silica coat is of from 0.01 and 5 wt. %, preferably 0.1 to 2 wt. %, and the alumina coat deposited on the silica coat is of from 0.1 and 10 wt. %, preferably 2 to 5 wt. % referred to the total weight of the titanium dioxide pigment particle.

After the formation of the at least one coat is completed, the titanium dioxide pigment particles are preferably separated from the aqueous suspension and washed in step (iii).

In another preferred embodiment of the invention, the undried, coated titanium dioxide pigment particles are subject to the further steps of (iv) drying the undried, coated titanium dioxide particles to obtain dried, coated titanium dioxide pigment particles, (v) providing an aqueous suspension of the dried, coated titanium dioxide particles, and (vi) transforming the dried, coated titanium dioxide particles back into the undried, coated titanium dioxide particles. By drying the undried, coated titanium dioxide particles, the latter are dried. By doing so, agglomerated pigment particles are obtained. This drying step can be accomplished by methods and techniques known in the art. Subsequently, a suspension of the dried, coated titanium dioxide particles can be provided, also by using standard methods and techniques. The transformation of the dried, coated titanium dioxide particles back into the undried state in step (vi) can be performed under certain condition. This involves, for example, agitating the suspension, a temperature of 40° C. to 80° C. at a pH value of 9 to 14 or 1 to 4 optionally under pressure of more than 1 atmosphere and optionally in presence of a dispersing agent and milling. Without being bound by theory, it is believed that treatment of the coated titanium dioxide particles under these conditions result in the outer coating layer being partially dissolved into the suspension. Using known coating techniques that are based upon the composition of the outer coating layer, the coating can be redeposited on the pigment particles, such as by further adjusting the pH or temperature of the suspension. In this context, the final coating can be considered to be applied during this redeposition process and thus the coated titanium dioxide particle is once again considered to be undried. This embodiment is advantageous, as the dried, coated titanium dioxide can be packed and stored for a long period of time. After storage, the dried is transformed into the undried, coated titanium dioxide particles having the same advantageous surface properties making it particularly suitable for a white pigment in aqueous printing inks as described within the scope of the present invention. However, results showed that the dispersibility of the thus obtained undried, coated titanium dioxide particles is inferior to the dispersibility of the undried, coated titanium dioxide particles obtained after conducting the steps (i) and (ii) and optionally (iii). Therefore, it is preferred that at all times the coated titanium dioxide pigment remains in the undried state and thus is never subjected to a drying process as discussed above.

The steps (iii) to (vi) are conducted in the order (iii), (iv), (v) and then (vi).

Preferably, the aqueous printing ink of the present invention comprises undried, coated titanium dioxide pigment particles as described herein and further comprises at least one dispersant selected from the group consisting of electrostatic dispersant, electrosteric dispersant and steric dispersant. A "steric dispersant", as used herein, refers to a dispersant with at least one attaching group attaching to a coated, undried titanium dioxide pigment particles and possesses segments which stand out from the pigment surface to provide mechanical repulsive forces. An "electrostatic dispersant", as used herein, refers to a dispersant with at least one attachment group with attaches to the coated, undried titanium dioxide pigment particles and establishes electric double layer causing repulsive forces. An "electrosteric dispersant", as used herein, is a combination of a steric and a electrostatic dispersant. The attachment group of the dispersants can be selected from those known from the art suitable to attach to the coated, undried titanium dioxide pigment particles. They can be selected from anionic, cationic, amphoteric and non-ionic groups such as carboxyl, phosphate, sulfate, hydroxide, and tetraalkyl amine such as tetra methyl amine, preferably from carboxyl, phosphate and sulfate. In a more preferred embodiment, the dispersant bears not only one type of attachment group, but two, three or more. Moreover, the dispersant can also bear different types of attachment group such as at least one carboxyl and at least one sulfate group. The dispersant preferably has a molecular weight of from 1.000 g/mol to 50.000 g/mol, preferably of from 2.000 g/mol to 25.000 g/mol. Due to the specific surface of the undried coated titanium dioxide pigment particles, the attaching groups of the dispersants attach to the pigment particles easily and to a high degree.

Preferred dispersants are based on polyacrylic acid, polycarboxylic acid copolymers, polyacrylates and poylurethanes having a molecular weight of between 1.000 to 50.000 g/mol, preferably between 2.000 to 25.000 g/mol. One of the most preferred dispersants is a sodium salt of a polyacrylate with a molecular weight of 1.000 to 50.000 g/mol, preferably between 2.000 to 25.000 g/mol.

As steric dispersant are oligomeric and polymeric dispersants suitable. Particularly preferred are block- and graft-polymers. "Oligomer", as used herein, refers to a compound built from monomers, wherein the oligomer has a molecular weight of 1.000 to 5.000 g/mol. "Polymer", as used herein, refers to a compound built from monomers, wherein the polymer has a molecular weight of 5.000 to 50.000 g/mol, preferably between 5.000 to 15.000 g/mol.

In a preferred embodiment, an electrostatic dispersant is used which is a sodium polyacrylate with a molecular weight of 5.000 to 10.000 g/mol and at least one carboxyl group.

Using dispersant as described further reduces the settlement tendency of the particles. The sodium polyacrylate with a molecular weight of 5.000 to 10.000 g/mol and at least one carboxyl group shows the best results.

In a further preferred embodiment, the aqueous printing ink of the present invention comprises (i) 1.0 to 30.0 wt. %, more preferably 12.0 to 25.0 wt. % and even more preferably 18.0 to 20.0 wt. % of the titanium dioxide pigment particles. In addition or alternatively, the ink can comprise:
(ii) 0.1 to 10.0 wt. %, more preferably 0.4 to 7.5 wt. %, and even more preferably 0.7 to 5.0 wt. % of the dispersant; and/or (iii) 60 to 99 wt. %, preferably 70.0 to 95.0 wt. %, more preferably 80.0 to 90.0 water; and/or (iv) 0.01 to 5 wt. %, more preferably 0.05 to 2.5 wt. % and even more preferably 0.1 to 1 wt. % of at least one additive selected from the group consisting of viscosity modifier, water-miscible organic solvent, surfactant, defoamer, biocide and humectant. All wt. % indicated are with respect to the total weight of the printing ink.

The additives can be added by common techniques and methods. The viscosity modifier is preferably selected from the group consisting of glycerol, polyethers, such as polyethylene glycol and poly(ethylene oxide), cellulose polymers such as hydroxyethyl cellulose, hydroxypropyl cellulose and carboxymethyl cellulose, water-soluble acrylics, water-soluble polyesters, water-soluble polyurethanes, homopolymers of 2-ethyl-oxazoline, for example poly-2-ethyl-2-oxazoline, polyvinyl alcohol and poly(vinylpyrrolidones) and mixtures thereof.

Preferred water-miscible organic solvents include d-6-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably 1,2,6-hexanetriol; mono-Ci-4-alkyl ethers of diols, preferably mono-Ci-4-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethylene glycol monoallyl ether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide; and sulfones.

Preferred water-miscible organic solvents are cyclic amides, especially 2-pyrrolidone, N-methyl-pyrrolidone and N-ethyl-pyrrolidone; diols, especially 1,5-pentane diol, ethylene glycol, diethylene glycol and triethylene glycol; and mono-C-i-4-alkyl and Ci-4-alkyl ethers of diols, more preferably mono-Ci-4-alkyl ethers of diols having 2 to 12 carbon atoms, especially 2-methoxy-2-ethoxy-2-ethoxyethanol.

Especially preferred solvents include 2-pyrrolidone, ethylene glycol, propylene glycol and diethylene glycol.

Further, surfactants can be employed and may be ionic or, more preferably, non-ionic. Acetylenic surfactants, fluoro surfactants and silicon surfactants are preferred. Examples of fluoro surfactants include Zonyl® and Capstone® grades from DuPont, e.g. Zonyl® FSO, FSN and FSA and short-chain perfluoro-based anionic fluorosurfactants such as Chemguard S-103A available from Chemguard. Acetylene surfactants are more preferred especially 2,4,7,9-tetramethyl-5-decyne-4,7-diol and ethylene oxide condensates thereof, for example Surfynol® and Dynol® surfactants available from Air Products. The ethylene oxide condensates of 2,4,7,9-tetramethyl-5-decyne-4,7-diol are particularly preferred. Mixtures containing different surfactants may be used. Mixed surfactants may be of the same type e.g. two non-ionic surfactants or be of different types e.g. an ionic and non-ionic surfactant.

The biocide which can also be a mixture of biocides can be used. It is preferred that the biocide comprises 1,2-benzisothazolin-3-one which is commercially available as an active solution from Lonza as Proxel® GXL and Bioban®, DXN (2,6-dimethyl-1,3-dioxan-4-yl acetate), from Dow Chemical Company, or Preventol P 91® from Lanxess which is a reaction product of 5-chloro-2-methyl-2H-isothiazole-2-one and 2-methyl-2H-isothiazole-3-one.

In another aspect, the present invention is directed to an aqueous slurry comprising
i) 40.0 to 70.0 wt. %, preferably 45.0 to 65.0 wt. %, more preferably 50.0 to 60.0 wt. % undried, coated titanium dioxide pigment particles obtainable by a method comprising the steps of a) providing an aqueous suspension of titanium dioxide base pigments, and b) forming at least one coat on said titanium dioxide base pigments, the coat is selected from the group consisting of silica, alumina, zirconia and mixtures thereof to obtain the undried, coated titanium dioxide pigment particles; and/or
ii) 0.2 to 20.0 wt. %, preferably 0.8 to 15 wt. %, and more preferably 1.5 to 10.0 wt. % of a dispersant; and/or
iii) 10.0 to 60.0 wt. %, preferably 20.0 to 50.0 wt. %, and more preferably 30.0 to 40.0 wt. % of water. All weight ranges indicated are with respect to the total weight of the aqueous slurry. In a preferred embodiment, the slurry comprises the undried, coated titanium dioxide pigment particles, the dispersant and water within the weight ranges given above. The slurry can be used as a concentrated precursor for the aqueous printing ink of the present invention which only needs to be diluted with water and mixed with further additives described herein.

In a further aspect, the present invention pertains to a method for obtaining an aqueous printing ink comprising undried, coated titanium dioxide pigment particles comprising the steps of. This method comprises the steps of (i) providing an aqueous suspension of titanium dioxide base pigments, (ii) coating the titanium dioxide pigment particles with at least one coat selected from the group consisting of silica, alumina, zirconia and mixtures thereof in order to obtain the undried, coated titanium dioxide pigment particles. In subsequent step (iii) the undried, coated titanium dioxide pigment particles can be optionally separated from the aqueous suspension and washed, and optionally re-dispersed in water to obtain the aqueous printing ink. In connection with the aqueous printing inks, it has already described herein as to how the steps can be conducted which can also be used here. Step (iii) is optional and can be conducted in the event that undesired byproducts need to be removed from the pigment particles and/or the aqueous printing ink.

Preferably, the method of the present invention also comprises step (iv) adding at least one dispersant selected from the group consisting of electrostatic dispersant, electrosteric dispersants and steric dispersant to obtain a mixture. Optionally, the obtained mixture is milled. This guarantees that the pigment particles interact with the dispersant.

EXAMPLES

Preparation of the Undried, Coated Titanium Dioxide Piment Particle

A titanium dioxide pigment suspension was provided by mixing titanium dioxide pigment particles (15 kg) with water (43 l). By adding an alkaline solution, the pH value was enhanced above 10. Then, an aqueous solution of sodium silicate was added over a course of 30 minutes in an amount to result in a 0.1 wt. % silica coat referred to the total weight of the final pigment particles. Then, sodium aluminate was added over a course of 30 minutes in an amount to result in a 3 wt. % alumina coat referred to the total weight of the final pigment particles. The thus obtained undried coated titanium dioxide pigment particles was filtered and washed. After washing the undried coated titanium dioxide pigment particles is milled by wet milling using zirconia beads to obtain the narrow particle size distribution required for inkjet inks. In particular, particle sizes greater than 600 nm should be excluded to the greatest extent possible, and preferably completely excluded, as they lead to clogging of the ink jet printhead nozzles. In case the dispersant is used, the additive is added before milling.

Preparation of the Aqueous Slurry with Undried, Coated Titanium Dioxide Piment Particles The undried coated titanium dioxide pigment particles were mixed with water and stirred to obtain an aqueous slurry. The final solid content of the respective slurries is equal to the weight percent of coated titanium dioxide particles based upon the total slurry composition.

Example 1

An aqueous slurry of undried coated titanium dioxide pigment particles (5.5 kg) as stated above was prepared. Subsequently, Additive 1 (142 g, 2.3 wt. % referred to the total weight of the undried coated titanium dioxide pigment particles) which is an electrostatic additive, was added to the suspension and stirred. The mixture was milled in the laboratory agitator bead mill LabStar from Netzsch-Feinmahltechnik GmbH, Germany, for 3 h using zirconia beads. The final solid content of the slurry was 57 wt. % referred to the total weight of the slurry.

Example 2

An aqueous slurry of undried coated titanium dioxide pigment particles (5.5 kg) as stated above was prepared. Subsequently, Additive 2 (321 g, 3.2 wt. % referred to the total weight of the undried coated titanium dioxide pigment particles), which is a steric additive, was added to the suspension and stirred. The mixture was milled in the laboratory agitator bead mill LabStar from Netzsch-Feinmahltechnik GmbH, Germany, for 3 h using zirconia beads. The final solid content of the slurry was 57 wt. % referred to the total weight of the slurry.

Example 3

An aqueous slurry of undried coated titanium dioxide pigment particles (5.6 kg) as stated above was prepared. Subsequently, Disperbyk 2018 (559 g; 7.5 wt. % dispersant referred to the total weight of the undried coated titanium dioxide pigment particles) obtainable from BYK in Wesel, Germany, an acrylate copolymer, which is a steric dispersant, was added to the suspension and stirred. The mixture was milled in the laboratory agitator bead mill LabStar from Netzsch-Feinmahltechnik GmbH, Germany, for 3 h using zirconia beads. The final solid content of the slurry was 57 wt. % referred to the total weight of the slurry.

Example 4

An aqueous slurry of undried coated titanium dioxide pigment particles (4.6 kg) as stated above was prepared. Subsequently, Dispex AA 4140 (99 g; 1.5 wt. % referred to the total amount of the undried coated titanium dioxide pigment particles) obtainable from BASF in Ludwigshafen, Germany, a sodium salt of acrylic polymer in water, which is an electrostatic dispersant, was added to the suspension and stirred. The mixture was milled in the laboratory agitator bead mill LabStar from Netzsch-Feinmahltechnik GmbH, Germany, for 3 h using zirconia beads. The final solid content of the slurry was 57 wt. % referred to the total weight of the slurry.

Example 5

An aqueous slurry of undried coated titanium dioxide pigment particles (3.7 kg) as stated above was prepared. Subsequently, Disperbyk 2010 (39.7 g; 4.8 wt. % referred to the total weight of the undried coated titanium dioxide pigment particles) obtainable from BYK in Wesel, Germany, an acrylate copolymer, which is a electrosteric dispersant, was added to the suspension and stirred. The mixture was milled in a laboratory agitator bead mill LabStar from Netzsch-Feinmahltechnik GmbH, Germany, for 3 h using zirconia beads. The final solid content of the slurry was 57 wt. % referred to the total weight of the slurry.

Preparation of the Aqueous Printing Ink with Undried, Coated Titanium Dioxide Pigment Particles Example 6

The slurry of Example 1 (approx. 300 g) was added to a mixture containing water, humectant and organic solvent (diethyleneglycole (22 wt. %), N-pyrrolidine (11 wt. %), water (67 wt. %)) to result in an aqueous printing ink which was stirred and had a solid content of 25 wt. % referred to the total weight of said ink. The final solid content of the respective aqueous printing inks is equal to the weight percent of coated titanium dioxide particles based upon the total aqueous printing ink composition.

Example 7

The slurry of Example 2 (approx. 300 g) was added to a mixture containing water, humectant and organic solvent (diethyleneglycole (22 wt. %), N-pyrrolidine (11 wt. %), water (67 wt. %)). The mixture was stirred. The solid content of the mixture was 25 wt. % referred to the total weight of said ink.

Example 8

The slurry of Example 3 (approx. 300 g) was added to a mixture containing water, humectant and organic solvent (diethyleneglycole (22 wt. %), N-pyrrolidine (11 wt. %), water (67 wt. %)). The mixture was stirred. The solid content of the mixture was 25 wt. % referred to the total weight of said ink.

Example 9

The slurry of Example 4 (approx. 300 g) was added to a mixture containing water, humectant and organic solvent (diethyleneglycole (22 wt. %), N-pyrrolidine (11 wt. %), water (67 wt. %)). The mixture was stirred. The solid content of the mixture was 25 wt. % referred to the total weight of said ink.

Example 10

The slurry of Example 5 (approx. 300 g) was added to a mixture containing water, humectant and organic solvent (diethyleneglycole (22 wt. %), N-pyrrolidine (11 wt. %), water (67 wt. %)). The mixture was stirred. The solid content of the mixture was 25 wt. % referred to the total weight of said ink.

Preparation of the Aqueous Slurry with Dried, Coated Titanium Dioxide Pigment Particles Titanium dioxide pigment particles K2300 (3.8 kg) commercially available from KRONOS Titan GmbH in Leverkusen, Germany, with a 0.5 wt. % silica coat on the base material and a 4 wt. % alumina coat on the silica coat referred to the total weight of the pigment particle was dispersed in water (approx. 2.3 l) and stirred to obtain an aqueous slurry with dried coated pigment particles. The final solid content of the respective slurries is equal to the weight percent of coated titanium dioxide particles based upon the total slurry composition.

Comparative Example 1

An aqueous slurry of dried coated titanium dioxide pigment particles as stated above was prepared. Subsequently, Additive 1 (196 g, 2.3 wt. % referred to the total weight of the dried, coated pigment particles), which is a steric dispersant, was added to the suspension and stirred. The mixture was milled in a laboratory agitator bead mill LabStar from Netzsch-Feinmahltechnik GmbH, Germany, for 3 h using zirconia beads. The final solid content of the slurry was 57 wt. % referred to the total weight of the slurry.

Comparative Example 2

An aqueous slurry of dried coated titanium dioxide pigment particles as stated above was prepared. Subsequently, Additive 2 (321 g, 3.2 wt. % referred to the total weight of the dried coated titanium dioxide pigment particles), which is a steric dispersant, was added to the suspension and stirred. The mixture was milled in a laboratory agitator bead mill LabStarfrom Netzsch-Feinmahltechnik GmbH, Germany, for 3 h using zirconia beads. The final solid content of the slurry was 57 wt. % referred to the total weight of the slurry.

Comparative Example 3

An aqueous slurry of dried coated titanium dioxide pigment particles as stated above was prepared. Subsequently, Disperbyk 2018 (544 g; 7.5 wt. % referred to the total weight of the dried, coated pigment particles) obtainable from BYK in Wesel, Germany, a acrylate copolymer, which is a steric dispersant, was added to the suspension and stirred. The mixture was milled in a laboratory agitator bead mill LabStarfrom Netzsch-Feinmahltechnik GmbH, Germany, for 3 h using zirconia beads. The final solid content of the slurry was 57 wt. % referred to the total weight of the slurry.

Comparative Example 4

An aqueous slurry of dried coated titanium dioxide pigment particles as stated above was prepared. Subsequently, Dispex AA 4140 (138 g; 1.5 wt. % referred to the total weight of the dried, coated pigment particles) obtainable from BASF in Ludwigshafen, Germany, a sodium salt of acrylic polymer in water, which is an electrostatic dispersant, was added to the suspension and stirred. The mixture was milled in a laboratory agitator bead mill LabStarfrom Netzsch-Feinmahltechnik GmbH, Germany, for 3 h using zirconia beads. The final solid content of the slurry was 57 wt. % referred to the total weight of the slurry.

Comparative Example 5

An aqueous slurry of dried coated titanium dioxide pigment particles. Subsequently, Disperbyk 2010 (507 g; 4.8 wt. % referred to the total weight of the dried, coated pigment particles obtainable from BYK in Wesel, Germany, an acrylate copolymer, which is a electrosteric dispersant, was added to the suspension and stirred. The mixture was milled in a laboratory agitator bead mill LabStar from Netzsch-Feinmahltechnik GmbH, Germany, for 3 h using zirconia beads. The final solid content of the slurry was 57 wt. % referred to the total weight of the slurry.

Preparation of the Aqueous Printing Ink with Dried, Coated Titanium Dioxide Pigment Particles Comparative Example 6

The slurry of Comparative Example 1 (approx. 300 g) was added to a mixture containing water, humectant and organic solvent (diethyleneglycole (22 wt. %), N-pyrrolidine (11 wt. %), water (67 wt. %)) to result in an aqueous printing ink which was stirred and had a solid content of 25 wt. % referred to the total weight of said ink. The final solid content of the respective aqueous printing inks is equal to the weight percent of coated titanium dioxide particles based upon the total aqueous printing ink composition.

Comparative Example 7

The slurry of Comparative Example 2 (approx. 300 g) was added to a mixture containing water, humectant and organic solvent (diethyleneglycole (22 wt. %), N-pyrrolidine (11 wt. %), water (67 wt. %)) to result in an aqueous printing ink which was stirred and had a solid content of 25 wt. % referred to the total weight of said ink.

Comparative Example 8

The slurry of Comparative Example 3 (approx. 300 g) was added to a mixture containing water, humectant and organic solvent (diethyleneglycole (22 wt. %), N-pyrrolidine (11 wt. %), water (67 wt. %)) to result in an aqueous printing ink which was stirred and had a solid content of 25 wt. % referred to the total weight of said ink.

Comparative Example 9

The slurry of Comparative Example 4 (approx. 300 g) was added to a mixture containing water, humectant and organic solvent (diethyleneglycole (22 wt. %), N-pyrrolidine (11 wt. %), water (67 wt. %)) to result in an aqueous printing ink which was stirred and had a solid content of 25 wt. % referred to the total weight of said ink.

Comparative Example 10

The slurry of Comparative Example 5 (approx. 300 g) was added to a mixture containing water, humectant and organic solvent (diethyleneglycole (22 wt. %), N-pyrrolidine (11 wt. %), water (67 wt. %)) to result in an aqueous printing ink which was stirred and had a solid content of 25 wt. % referred to the total weight of said ink.

Test Methods and Test Results

Particle Size Determination

The size of the titanium dioxide particles were determined by using a CPS Disc centrifuge, Model DC 20000 available from CPS Instrument, Inc. located in Florida, United States of America. The sample was prepared by obtaining a first premix by mixing 2 g of a dry pigment particles with 80 g sodium hexametaphosphate (0.06 mass % in water) commercially available from BK Giulini GmbH in Ladenburg, Germany, under the name Calgon N until the first premix was homogenized. Subsequently, 2 g of this first premix were added to 48 g Calgon N, and again sufficiently homogenized by mixing to obtain a second premix. 100 µl of this second premix were used as the sample for determining the particle size. The centrifuge was operated at 3,000 rpm. The calibration standard parameters were as follows:

Particle density: 1.385 g/mL
Peak diameter: 1.27 μL
Half height peak width: 0.08 μL The fluid parameters were as follows:

Fluid density: 1.045 g/mL
Fluid refraction index: 1.344
Fluid viscosity: 1.2 cps Sedimentation Test The tendency of pigment to settle was observed by the amount of serum (clear phase) which formed over time. The second criteria was the formation of a sediment on the bottom of the bottle. A sediment which is hard or sticky cannot be re-dispersed well and is therefore not suitable for inkjet printing for two reasons: First, the nozzles of the inkjet printhead will clog and second, settlement will lead to differences in opacity since the ink will contain less titanium dioxide in the upper phase, than in the lower phase. Therefore, it is necessary to prove good stability in terms of anti-settlement and at the same time prevent the formation of any sediment.

For the experiment 40 ml of each example was stored in a 50 ml glass bottle. The sediment was evaluated with a plastic rod. It is important for both, the slurry and the ink that there is no pigment sediment on the bottom of the bottle and that the suspension is easy to homogenize which was awarded with "(+)". The complete evaluation criteria are given in Table 1.

TABLE 1

Evaluation criteria for formation of a sediment.

| Evaluation | Sediment |
|---|---|
| + | No visible sediment |
| 0 | Sediment, but easy to re-disperse by stirring |
| − | Hard or sticky sediment, not easy to re-disperse by stirring |

For evaluation of the sedimentation tendency the following criteria were chosen. Serum is given in mm. The suspension height in the 50 ml graduated glass is 129 mm. The less serum is formed over time the better. The experiments were conducted at 22° C. and at 50° C.

For sedimentation tests the solid content of the aqueous slurries, containing the dried coated titanium dioxide pigment particles and water was adjusted with water to 25 wt. % referred to the total weight of said slurry. As discussed above, the solids content of the aqueous slurries is the same as the total amount of coated titanium dioxide by weight, based on the total suspension.

TABLE 2

Sedimentation tendency tests at various temperatures for aqueous slurries.

| | Example 1 | | Comparative Example 1 | |
|---|---|---|---|---|
| Time | 22° C. Serum mm/ Sediment | 50° C. Serum mm/ Sediment | 22° C. Serum mm/ Sediment | 50° C. Serum mm/ Sediment |
| 1 day | 4/+ | 5/+ | 10/+ | 11/+ |
| 7 days | 11/+ | 13/+ | 38/− | 47/− |
| 14 days | 16/+ | 15/+ | 47/− | 60/− |
| 21 days | 19/+ | 18/+ | 54/− | 65/− |

TABLE 2-continued

Sedimentation tendency tests at various temperatures for aqueous slurries.

| | Example 2 | | Comparative Example 2 | |
|---|---|---|---|---|
| Time | 22° C. Serum mm/ Sediment | 50° C. Serum mm/ Sediment | 22° C. Serum mm/ Sediment | 50° C. Serum mm/ Sediment |
| 1 day | 0/+ | 0/+ | 0/− | 1/− |
| 7 days | 0/+ | 0/+ | 5/− | 9/− |
| 14 days | 0/+ | 0/+ | 11/− | 16/− |
| 21 days | 0/+ | 1/+ | 16/− | 26/− |

| | Example 3 | | Comparative Example 3 | |
|---|---|---|---|---|
| Time | 22° C. Serum mm/ Sediment | 50° C. Serum mm/ Sediment | 22° C. Serum mm/ Sediment | 50° C. Serum mm/ Sediment |
| 1 day | 0/+ | 0/+ | 0/+ | 0/+ |
| 7 days | 3/+ | 3/+ | 3/+ | 4/+ |
| 14 days | 3/+ | 5/+ | 8/+ | 11/0 |
| 21 days | 3/+ | 8/+ | 8/0 | 21/0 |

| | Example 4 | | Comparative Example 4 | |
|---|---|---|---|---|
| Time | 22° C. Serum mm/ Sediment | 50° C. Serum mm/ Sediment | 22° C. Serum mm/ Sediment | 50° C. Serum mm/ Sediment |
| 1 day | 0/+ | 0/+ | 3/+ | 5/+ |
| 7 days | 1/+ | 4/+ | 15/+ | 26/+ |
| 14 days | 1/+ | 4/+ | 26/+ | 42/+ |
| 21 days | 3/+ | 5/+ | 34/+ | 53/+ |

| | Example 5 | | Comparative Example 5 | |
|---|---|---|---|---|
| Time | 22° C. Serum mm/ Sediment | 50° C. Serum mm/ Sediment | 22° C. Serum mm/ Sediment | 50° C. Serum mm/ Sediment |
| 1 day | 0/+ | 0/+ | 0/+ | 0/+ |
| 7 days | 0/+ | 0/+ | 5/+ | 5/+ |
| 14 days | 0/+ | 0/+ | 7/− | 11/0 |
| 21 days | 0/+ | 0/+ | 13/− | 24/0 |

TABLE 3

Sedimentation tendency tests at various temperatures for aqueous printing inks.

| | Example 6 | | Comparative Example 6 | |
|---|---|---|---|---|
| Time | 22° C. Serum mm/ Sediment | 50° C. Serum mm/ Sediment | 22° C. Serum mm/ Sediment | 50° C. Serum mm/ Sediment |
| 1 day | 2/+ | 0/+ | 0/− | 0/− |
| 7 days | 5/0 | 3/0 | 5/− | 15/− |
| 14 days | 9/0 | 8/0 | 13/− | 19/− |
| 21 days | 109/0 | 114/0 | 111/− | 116/− |

| | Example 7 | | Comparative Example 7 | |
|---|---|---|---|---|
| Time | 22° C. Serum mm/ Sediment | 50° C. Serum mm/ Sediment | 22° C. Serum mm/ Sediment | 50° C. Serum mm/ Sediment |
| 1 day | 0/+ | 0/+ | 0/+ | 0/+ |
| 7 days | 3/+ | 5/+ | 6/− | 11/− |
| 14 days | 4/+ | 12/+ | 12/− | 16/− |
| 21 days | 5/+ | 13/+ | 114/− | 113/− |

TABLE 3-continued

Sedimentation tendency tests at various temperatures for aqueous printing inks.

| | Example 8 | | Comparative Example 8 | |
|---|---|---|---|---|
| Time | 22° C. Serum mm/ Sediment | 50° C. Serum mm/ Sediment | 22° C. Serum mm/ Sediment | 50° C. Serum mm/ Sediment |
| 1 day | 0/+ | 0/+ | 0/+ | 0/+ |
| 7 days | 4/+ | 5/+ | 4/– | 8/– |
| 14 days | 5/+ | 8/+ | 6/– | 13/– |
| 21 days | 116/+ | 117/+ | 117/– | 118/– |
| | Example 9 | | Comparative Example 9 | |
| Time | 22° C. Serum mm/ Sediment | 50° C. Serum mm/ Sediment | 22° C. Serum mm/ Sediment | 50° C. Serum mm/ Sediment |
| 1 day | 0/+ | 0/+ | 0/+ | 0/+ |
| 7 days | 2/+ | 7/+ | 5/+ | 16/+ |
| 14 days | 5/+ | 11/+ | 10/+ | 21/+ |
| 21 days | 12/+ | 114/+ | 104/+ | 111/+ |
| | Example 10 | | Comparative Example 10 | |
| Time | 22° C. Serum mm/ Sediment | 50° C. Serum mm/ Sediment | 22° C. Serum mm/ Sediment | 50° C. Serum mm/ Sediment |
| 1 day | 0/+ | 0/+ | 0/+ | 0/+ |
| 7 days | 3/+ | 5/+ | 6/+ | 11/+ |
| 14 days | 8/+ | 5/+ | 10/+ | 16/– |
| 21 days | 8/+ | 113/+ | 22/+ | 132/– |

As compared to the Comparative Examples prepared with dried titanium dioxide pigment particles, the aqueous slurries and inks prepared according to the invention possess significantly increased stability, do not settle, and even more importantly the prepared aqueous slurries and inks according to the invention are not forming any sediment, hard sediment or sticky sediment at room temperatures as well as at an elevated temperature. This is made evident by the above Examples which show less serum and less sediment formation compared to its corresponding Comparative Examples. The sediment of the inks and slurries of the Comparative Examples will clog the nozzles of the inkjet printhead which is undesired. In addition, the sediment will disadvantageously lower the opacity. As a result, the inks have to be printed more often onto the substrate to achieve the same print image compared to the inks of the present invention.

The invention claimed is:

1. An aqueous printing ink comprising undried, coated titanium dioxide pigment particles obtained by a method comprising the steps of:
   (i) providing an aqueous suspension of titanium dioxide base pigments,
   (ii) forming at least one coat on said titanium dioxide base pigments, the coat is selected from the group consisting of a silica coat, an alumina coat, a zirconia coat and combinations thereof to obtain the undried, coated titanium dioxide pigment particles, wherein the step of forming at least one coat comprises forming a silica coat on the titanium dioxide base pigments, and subsequently forming an alumina coat on the titanium dioxide base pigments over the silica coat;
   (iii) forming an aqueous printing ink comprising the undried coated titanium dioxide pigment particles formed in step (ii); and wherein the coated titanium dioxide pigment particles are not subjected to a drying step having a temperature above 80° C. and have not had water removed until a constant weight was achieved;
wherein the printing ink further comprises:
   12.0 to 25.0 wt. % of the titanium dioxide pigment particles with respect to the total weight of the printing ink;
   at least one dispersant; and
   wherein aqueous ink does not form a hard precipitate after 21 days at a temperature of 50° C.

2. The aqueous printing ink of claim 1, wherein the alumina coat is deposited on the silica coat.

3. The aqueous printing ink of claim 1, wherein the alumina coat forms the outer coating layer on the titanium dioxide base pigments.

4. The aqueous printing ink of claim 1 further comprising the steps of:
   separating the undried, coated titanium dioxide pigment particles from the aqueous suspension prior to step (iii) and washing the undried, coated titanium dioxide pigment particles from the aqueous suspension.

5. The aqueous printing ink of claim 4 further comprising the steps of:
   (iv) drying the undried, coated titanium dioxide particles to obtain dried, coated titanium dioxide particles,
   (v) providing an aqueous suspension of the dried, coated titanium dioxide particles, and
   (vi) transforming the dried, coated titanium dioxide particles into the undried, coated titanium dioxide particles.

6. The aqueous printing ink of claim 5 wherein step (vi) involves the steps of:
   dispersing the dried coated titanium dioxide particles in water to form an aqueous suspension;
   adjusting the suspension to a temperature selected within the range of from 40° C. to 80° C. and to a pH value selected outside the range of from 4 to 9;
   agitating the suspension for a period of time;
   adjusting the suspension to a temperature and a pH adequate to deposit the at least one coat on the titanium dioxide.

7. The aqueous printing ink of claim 1 wherein the at least one dispersant is selected from the group consisting of electrostatic dispersants, electrosteric dispersants, steric dispersants and combinations thereof.

8. The aqueous printing ink of claim 7, wherein:
   (i) the at least one dispersant has at least one attaching group selected from the group consisting of carboxyl, phosphate, sulfate, hydroxide, and tetraalkyl amine groups.

9. The aqueous printing ink of claim 8 wherein the at least one attaching group is selected from the group consisting of carboxyl, phosphate and sulfate group.

10. The aqueous printing ink of claim 7, wherein the dispersant is based on a compound selected from the group consisting of polyacrylic acid, polycarboxylic acid copolymers, polyacrylates, poylurethanes and combinations thereof.

11. The aqueous printing ink of claim 7, wherein the dispersant is a sodium salt of a polyacrylate.

12. The aqueous printing ink of claim 7 wherein the printing ink comprises:
   (ii) 0.1 to 10.0 wt. % of the dispersant with respect to the total weight of the printing ink;
   (iii) 60.0 to 99.0 wt. % water with respect to the total weight of the printing ink; and (iv) at least one additive selected from the group consisting of viscosity modifier, water-miscible organic solvent, surfactant, defoamer, biocide and humectant.

13. The aqueous printing ink of claim 12 wherein the printing ink comprises:
(i) 12.0 to 25.0 wt. % of the titanium dioxide pigment particles with respect to the total weight of the printing ink;
(ii) 0.4 to 7.5 wt. % of the dispersant with respect to the total weight of the printing ink; and
(iii) 70.0 to 95.0 wt. % water with respect to the total weight of the printing ink.

14. The aqueous printing ink of claim 12 wherein the printing ink comprises:
(i) 18.0 to 20.0 wt. % of the titanium dioxide pigment particles with respect to the total weight of the printing ink;
(ii) 0.7 to 5.0 wt. % of the dispersant with respect to the total weight of the printing ink; and
(iii) 80.0 to 90.0 wt. % water with respect to the total weight of the printing ink.

15. A method for obtaining an aqueous printing ink comprising undried, coated titanium dioxide pigment particles comprising the steps of:
(i) providing an aqueous suspension of titanium dioxide base pigments,
(ii) coating the titanium dioxide base pigments with at least one coat selected from the group consisting of a silica coat, an alumina coat, a zirconia coat and combinations thereof in order to obtain undried, coated titanium dioxide pigment particles, wherein a silica coat is formed on the base pigments, and an alumina coat is formed as the outer coating layer over the silica coat,
(iii) optionally separating and washing the undried, coated titanium dioxide pigment particles from the aqueous suspension, and redispersing the obtained undried, coated titanium dioxide pigment particles in water in an amount from 12.0 to 25.0 wt. % of the titanium dioxide pigment particles with respect to the total weight of the printing ink along with at least one dispersant to obtain the aqueous printing ink;
wherein the coated titanium dioxide pigment particles are not subjected to a drying step having a temperature above 80° C. and have not had water removed until a constant weight was achieved;
wherein the aqueous ink does not form a hard precipitate after 21 days at a temperature of 50° C.

16. The method of claim 15 where:
the at least one dispersant is selected from the group consisting of electrostatic dispersants, electrosteric dispersants, steric dispersants, and mixtures thereof, to the undried, coated titanium dioxide pigment particles to obtain a mixture, and
(v) optionally milling the obtained mixture.

17. The method of claim 15 further comprising the step of printing the aqueous printing ink onto the surface of a substrate.

18. The method of claim 17 wherein the substrate is selected from the group consisting of paper, décor papers, corrugated cardboards, packaging, plastics, polymeric films, printed circuit boards, computer chips, automotives, wood, metal, glass, textiles and leather.

19. An aqueous slurry for use in an aqueous ink comprising:
(i) 40.0 to 70.0 wt. % undried, coated titanium dioxide pigment particles with respect to the total weight of the aqueous slurry obtained by a method comprising the steps of:
a) providing an aqueous suspension of titanium dioxide base pigments, and
b) forming at least one coat on said titanium dioxide base pigments, the coat is selected from the group consisting of a silica coat, an alumina coat, a zirconia coat and combinations thereof to obtain the undried, coated titanium dioxide pigment particles, wherein the step b) of forming includes forming a silica coat on the base pigments, and forming an alumina coat as the outer coating layer over the silica coat; and
(ii) 0.2 to 20.0 wt. % of a dispersant with respect to the total weight of the aqueous slurry; and/or
(iii) 10.0 to 60.0 wt. % water with respect to the total weight of the aqueous slurry;
wherein the coated titanium dioxide pigment particles are not subjected to a drying step having a temperature above 80° C. and have not had water removed until a constant weight was achieved;
wherein the printing ink further comprises:
(iv) at least one dispersant;
wherein aqueous slurry does not form a hard precipitate after 21 days at a temperature of 50° C.

20. The aqueous slurry of claim 19 wherein the aqueous slurry comprises:
(i) 45.0 to 65.0 wt. % undried, coated titanium dioxide pigment particles with respect to the total weight of the aqueous slurry;
(ii) 0.8 to 15 wt. % of a dispersant with respect to the total weight of the aqueous slurry; and
(iii) 20.0 to 50.0 wt. % water with respect to the total weight of the aqueous slurry.

21. The aqueous slurry of claim 20 wherein the aqueous slurry comprises:
(i) 50.0 to 60.0 wt. % undried, coated titanium dioxide pigment particles with respect to the total weight of the aqueous slurry;
(ii) 1.5 to 10.0 wt. % of a dispersant with respect to the total weight of the aqueous slurry; and
(iii) 30.0 to 40.0 wt. % water with respect to the total weight of the aqueous slurry.

22. The aqueous printing ink of claim 1 wherein the aqueous printing ink is contained in a printing ink container.

23. The aqueous printing ink of claim 1 wherein the ink is adapted to be used in an inkjet printer.

* * * * *